United States Patent
Boni et al.

(10) Patent No.: US 12,493,180 B2
(45) Date of Patent: Dec. 9, 2025

(54) MICROELECTROMECHANICAL MIRROR DEVICE WITH PIEZOELECTRIC ACTUATION HAVING IMPROVED STRESS RESISTANCE

(71) Applicant: STMicroelectronics S.r.l., Agrate Brianza (IT)

(72) Inventors: Nicolo' Boni, Mountain View, CA (US); Roberto Carminati, Piancogno (IT); Massimiliano Merli, Pavia (IT); Carlo Luigi Prelini, Seveso (IT); Tarek Afifi Afifi, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 368 days.

(21) Appl. No.: 18/131,085

(22) Filed: Apr. 5, 2023

(65) Prior Publication Data
US 2023/0324674 A1 Oct. 12, 2023

(30) Foreign Application Priority Data
Apr. 11, 2022 (IT) .......................... 102022000007121

(51) Int. Cl.
G02B 26/08 (2006.01)
B81B 3/00 (2006.01)
B81C 1/00 (2006.01)

(52) U.S. Cl.
CPC .......... *G02B 26/0858* (2013.01); *B81B 3/007* (2013.01); *B81C 1/00658* (2013.01); *B81B 2201/042* (2013.01)

(58) Field of Classification Search
CPC .. G02B 26/0858; G02B 26/085; B81B 3/007; B81B 2201/042; B81B 7/02; B81C 1/00658
See application file for complete search history.

(56) References Cited

U.S. PATENT DOCUMENTS

2004/0004775 A1   1/2004   Turner et al.
2020/0192199 A1*  6/2020   Boni .................. G02B 26/0858

FOREIGN PATENT DOCUMENTS

CN   102067009 A   5/2011
CN   103282819 A   9/2013
(Continued)

OTHER PUBLICATIONS

IT Search Report and Written Opinion for priority application, IT Appl. 102022000007121, report dated Oct. 31, 2022, 7 pgs.
(Continued)

*Primary Examiner* — Euncha P Cherry
(74) *Attorney, Agent, or Firm* — Crowe & Dunlevy LLC (57) ABSTRACT

A microelectromechanical mirror device has, in a die of semiconductor material: a fixed structure defining a cavity; a tiltable structure carrying a reflecting region, elastically suspended above the cavity and having a main extension in a horizontal plane; at least one first pair of driving arms, carrying respective piezoelectric structures which can be biased to generate a driving force that causes rotation of the tiltable structure about a rotation axis parallel to a first horizontal axis of the horizontal plane; elastic suspension elements, which elastically couple the tiltable structure to the fixed structure at the rotation axis and are rigid to movements out of the horizontal plane and compliant to torsion about the rotation axis. In particular, the driving arms of the first pair are magnetically coupled to the tiltable structure to cause its rotation about the rotation axis by magnetic interaction, following biasing of the respective piezoelectric structures.

20 Claims, 5 Drawing Sheets

(56) References Cited

FOREIGN PATENT DOCUMENTS

| | | |
|---|---|---|
| CN | 104111527 A | 10/2014 |
| CN | 113009684 A | 6/2021 |
| CN | 219916077 U | 10/2023 |
| EP | 3666727 A1 | 6/2020 |

OTHER PUBLICATIONS

CN First Office Action and Search Report for counterpart CN Appl. No. 202310372761.9, report dated Aug. 8, 2025, 6 pgs.

* cited by examiner

MICROELECTROMECHANICAL MIRROR DEVICE WITH PIEZOELECTRIC ACTUATION HAVING IMPROVED STRESS RESISTANCE

This application claims the priority benefit of Italian Application for Patent No. 102022000007121 filed on Apr. 11, 2022, the content of which is hereby incorporated by reference in its entirety to the maximum extent allowable by law.

TECHNICAL FIELD

This disclosure relates to a microelectromechanical mirror device made with Micro-Electro-Mechanical System (MEMS) technology with a piezoelectric actuation having improved stress resistance.

BACKGROUND

As it is known, microelectromechanical mirror devices are used in portable apparatuses such as, for example, smartphones, tablets, notebooks, PDAs, for optical applications, in particular for directing with desired patterns beams of light radiation generated by a light source (for example, a laser source). Thanks to the small dimensions, these devices allow the meeting of stringent requirements regarding the occupation of space, in terms of area and thickness.

For instance, microelectromechanical mirror devices are used in optoelectronic apparatuses, such as miniaturized projectors (so-called picoprojectors), which are able to project images at a distance and generate desired light patterns.

Microelectromechanical mirror devices generally include a tiltable structure that carries an appropriate reflecting (or mirror) surface, supported elastically above a cavity and obtained starting from a body of semiconductor material so as to be mobile, for example, with a movement of inclination or rotation out of a corresponding plane of main extension, for directing incident light beams in a desired manner.

Rotation of the mirror device is controlled through an actuation system that may, for example, be of an electrostatic, electromagnetic or piezoelectric type.

Electrostatic actuation systems in general have the disadvantage of utilizing high operating voltages, whereas electromagnetic actuation systems in general entail a high power consumption; it has therefore been proposed to control the movement of the tiltable mirror structure with piezoelectric actuation.

Mirror devices with piezoelectric actuation have the advantage of utilizing actuation voltages and power consumption levels lower than devices with electrostatic or electromagnetic actuation.

Figure 1:
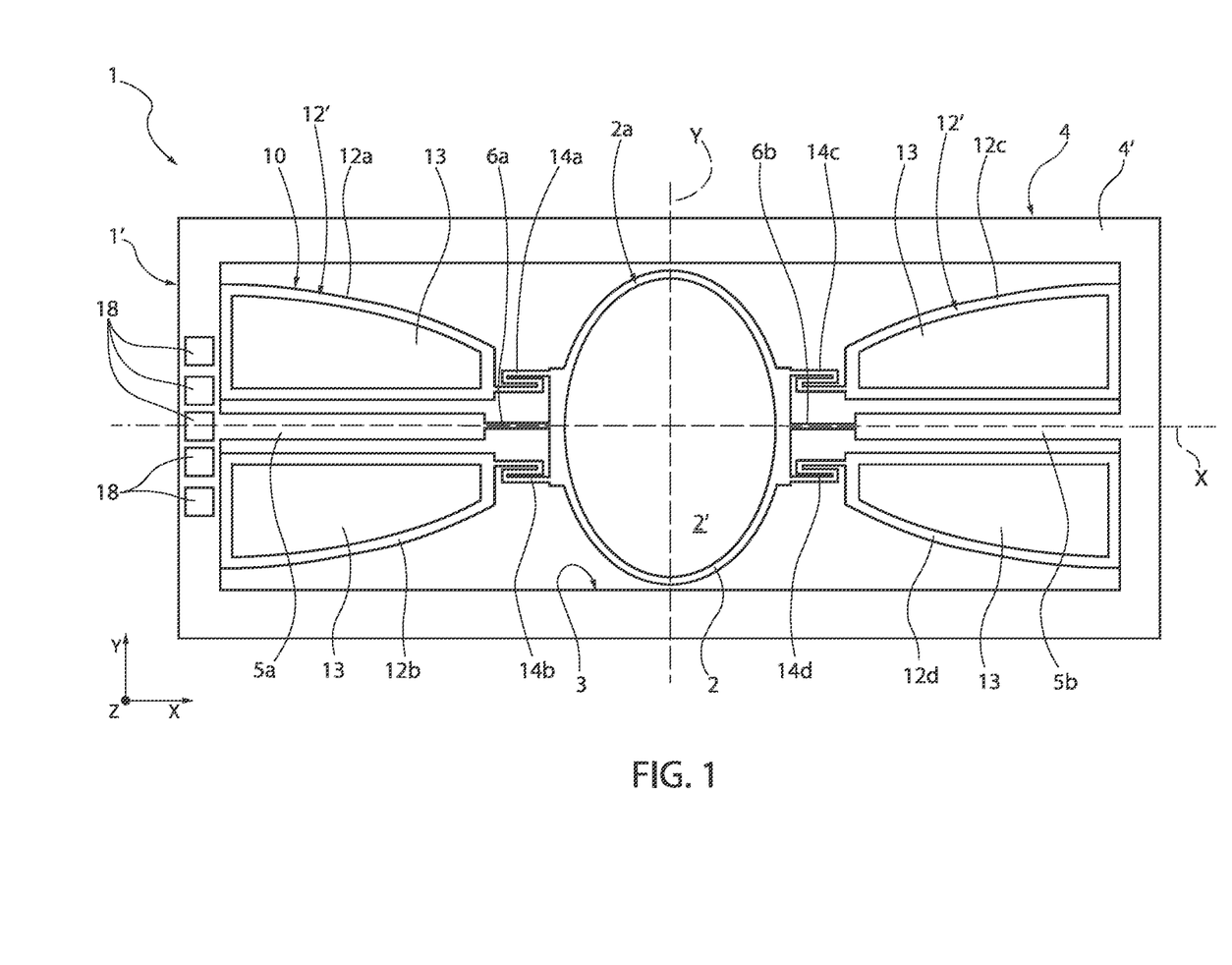
FIG. 1 shows a schematic top view of a microelectromechanical mirror device of a known type.

FIG. 1 is a schematic illustration of a microelectromechanical mirror device of a known type, based on MEMS technology, designated by 1; this device has in general the structure described in United States Patent Publication No. 2020/0192199 (corresponding to EP 3666727A1), incorporated by reference herein in its entirety.

The microelectromechanical mirror device 1 is formed in a die 1' of semiconductor material, in particular silicon, and is provided with a tiltable structure 2, having a main extension in a horizontal plane xy and arranged so as to rotate about a rotation axis X, parallel to a first horizontal axis x of the aforesaid horizontal plane xy.

The aforesaid rotation axis represents a first median axis of symmetry for the microelectromechanical mirror device 1; a second median axis of symmetry Y for the same microelectromechanical mirror device 1 is parallel to a second horizontal axis y, orthogonal to the first horizontal axis x and defining, with the first horizontal axis x, the horizontal plane xy.

The tiltable structure 2 is suspended over a cavity 3, provided in the die 1' and defines a supporting structure, which carries on a top surface 2a thereof (opposite to the cavity 3) a reflecting region 2', for example, of aluminum, or gold, according to whether the projection is in the visible or in the infrared, so as to define a mirror structure.

The tiltable structure 2 is elastically coupled to a fixed structure 4, defined in the die 1'. In particular, the fixed structure 4 forms, in the horizontal plane xy, a frame 4' that delimits and surrounds the aforesaid cavity 3 and moreover has a first supporting (or anchorage) element 5a and a second supporting (or anchorage) element 5b, which extend longitudinally along the first median axis of symmetry X within the cavity 3 starting from the same frame 4', on opposite sides of the tiltable structure 2 (along the first horizontal axis x).

The tiltable structure 2 is supported by the first and the second supporting elements 5a, 5b, to which it is elastically coupled by a first elastic suspension element 6a and, respectively, a second elastic suspension element 6b, having a high stiffness to movements out of the horizontal plane xy (along an orthogonal axis z, transverse to this horizontal plane xy) and compliant to torsion about the first horizontal axis x. The first and second elastic suspension elements 6a, 6b extend as a whole along the first rotation axis X, between the first and second supporting elements 5a, 5b and a facing side of the tiltable structure 2, to which they are coupled at a corresponding central portion. In the embodiment illustrated, the first and second elastic suspension elements 6a, 6b are of a linear type.

The first and second elastic suspension elements 6a, 6b couple the tiltable structure 2 to the fixed structure 4, enabling rotation thereof about the first rotation axis X and providing a high stiffness to movements out of the plane, thus providing a high ratio between the frequencies of spurious movements out of the horizontal plane xy and the frequency of rotation about the first rotation axis.

The microelectromechanical mirror device 1 further comprises an actuation structure 10, coupled to the tiltable structure 2 and configured to cause rotation thereof about the first rotation axis X; the actuation structure 10 is interposed between the tiltable structure 2 and the fixed structure 4 and furthermore contributes to supporting the tiltable structure 2 over the cavity 3.

This actuation structure 10 comprises a first pair of driving arms formed by a first driving arm 12a and by a second driving arm 12b, which are arranged on opposite sides of, and symmetrically with respect to, the first rotation axis X and the first supporting element 5a, and having a longitudinal extension parallel to the first horizontal axis x and to the aforesaid first supporting element 5a.

In the embodiment illustrated in FIG. 1, the driving arms 12a, 12b have a generically trapezoidal (or "fin") shape, with major side directed parallel to the second horizontal axis y integrally coupled to the frame 4' of the fixed structure 4 and minor side directed parallel to the same second horizontal axis y elastically coupled to the tiltable structure 2. Each driving arm 12a, 12b therefore has a respective first end integrally coupled to the frame 4' of the fixed structure 4 and a respective second end mechanically coupled to the tiltable structure 2 by a respective first elastic driving element 14a and second elastic driving element 14b.

Each driving arm 12a, 12b is suspended over the cavity 3 and carries, at a top surface 12' thereof (opposite to the same cavity 3) a respective piezoelectric structure 13 (in particular including PZT—lead zirconate titanate), having, for example, substantially the same extension in the horizontal plane xy as the driving arm 12a, 12b.

This piezoelectric structure 13 (in a way not illustrated in detail) is formed by the superposition of a bottom-electrode region, of an appropriate conductive material, arranged on the corresponding driving arm 12a, 12b; a region of piezoelectric material (for example, constituted by a thin film of PZT) arranged on the aforesaid bottom-electrode region; and a top-electrode region arranged on the region of piezoelectric material.

The aforesaid first and second elastic driving elements 14a, 14b have a high stiffness in regard to movements out of the horizontal plane xy (along the orthogonal axis z) and are compliant to torsion (about a rotation axis parallel to the first horizontal axis x). The first and second elastic driving elements 14a, 14b extend between the first and the second driving arms 12a, 12b and a same facing side of the tiltable structure 2.

The first and the second elastic decoupling elements 14a, 14b are coupled to the tiltable structure 2 at a respective coupling point, which is located in proximity of the first rotation axis X, at a short distance from the same first rotation axis X.

The first and second elastic driving elements 14a, 14b are, in the example, of a folded type, namely, they are formed by a plurality of arms, having a longitudinal extension parallel to the first horizontal axis x, connected in pairs by connection elements having an extension parallel to the second horizontal axis y (in a different embodiment, the elastic decoupling elements 14a, 14b may alternatively be of a linear type).

The aforesaid actuation structure 10 further comprises a second pair of driving arms formed by a third driving arm 12c and a fourth driving arm 12d, which are arranged on opposite sides with respect to the first rotation axis X and, this time, to the second supporting element 5b and having a longitudinal extension parallel to the first horizontal axis x and to the aforesaid second supporting element 5b (it should be noted that the second pair of driving arms 12c, 12d is therefore arranged in a way symmetrical to the first pair of driving arms 12a, 12b with respect to the second median axis of symmetry Y).

Similarly to what has been discussed for the first pair of driving arms 12a, 12b, each driving arm 12c, 12d of the second pair carries, at a top surface 12' thereof, a respective piezoelectric structure 13 (in particular including PZT—lead zirconate titanate) and has a respective first end integrally coupled to the frame 4' of the fixed structure 4 and a respective second end elastically coupled to the tiltable structure 2 by a respective third elastic driving element 14c and fourth elastic driving element 14d (arranged on opposite sides of the first and the second elastic driving elements 14a, 14b with respect to the second median axis of symmetry Y).

As illustrated in the aforesaid FIG. 1, the third and fourth elastic driving elements 14c, 14d are coupled to the tiltable structure 2 at a respective coupling point, which is located in proximity of the first rotation axis X; furthermore, the third and fourth elastic driving elements 14c, 14d are of a folded type.

The microelectromechanical mirror device 1 further comprises a plurality of electrical contact pads 18, carried by the fixed structure 4 at the frame 4', electrically connected (in a way not illustrated in detail in the same FIG. 1) to the piezoelectric structures 13 of the driving arms 12a-12d by electrical connection tracks, to enable electrical biasing thereof by electrical signals coming from the outside of the microelectromechanical mirror device 1 (for example, being provided by a biasing device of an electronic apparatus in which the microelectromechanical mirror device 1 is integrated).

During operation of the microelectromechanical mirror device 1, application of a biasing voltage to the piezoelectric structure 13 of the first driving arm 12a (having a positive value with respect to the biasing of the piezoelectric structure 13 of the second driving arm 12b, which may, for example, be connected to a ground reference potential), causes a rotation of a positive angle about the first rotation axis X. In a corresponding manner, application of a biasing voltage to the piezoelectric structure 13 of the second driving arm 12b (having a positive value with respect to the biasing of the piezoelectric structure 13 of the first driving arm 12a), causes a corresponding rotation of a negative angle about the same first rotation axis X.

It should be noted that the same biasing voltage may advantageously be applied to the piezoelectric structures 13 both of the first driving arm 12a and of the third driving arm 12c, and, similarly, in order to cause the opposite rotation, to the piezoelectric structures 13 both of the second driving arm 12b and of the fourth driving arm 12d so as to contribute in a corresponding manner to the rotation of the tiltable structure 2 about the first rotation axis X (as it is clear from the foregoing description).

The tiltable structure 2 may reach in this way wide opening angles (for example, comprised between 8° and 12°) in the presence of a low value of the biasing voltage (for example<40 V).

The elastic driving elements 14a-14d elastically decouple the displacement by the piezoelectric effect of the driving arms 12a-12d along the orthogonal axis z from the consequent rotation of the tiltable structure 2 along the first rotation axis.

These elastic driving elements 14a-14d have a thin and elongated configuration in order to reduce the torsional stiffness thereof and are subject, in a way that will be clear, to a mechanical stress that increases as the opening angles of the tiltable structure 2 increase.

In this regard, the general demand to reduce the dimensions of the microelectromechanical mirror devices is known, in order to obtain a greater miniaturization of the resulting optoelectronic devices.

In particular, an increase in efficiency of the aforesaid piezoelectric structures 13, for example using techniques of multilayer physical vapor deposition (PVD) of the corresponding piezoelectric materials, may enable a reduction in the surface occupied by the actuation structure 10 and, consequently, in the area occupied by the die 1 ' of the microelectromechanical mirror device 1.

For instance, the Inventors have found that it is desirable to reduce the occupation of area by the aforesaid die 1' by 20%, given the same optical performance.

The Inventors have, however, found that the reduction of the occupation of area and/or the aforesaid increase in efficiency of the piezoelectric structures 13 is in general accompanied by an increase of the mechanical stress to which the elastic driving elements 14a-14b are subjected; for example, this increase may even reach 20% in the aforesaid example of reduction of the occupation of area of the die 1'.

There is therefore the possibility of damage or failure of the elastic driving elements 14a-14b and in any case the aforesaid considerations pose constraints on the sizing of these elastic driving elements 14a-14b and in general on the reduction of the dimensions of the die 1' beyond a certain value.

Given this, further development is needed.

There is a need in the art to provide a microelectromechanical mirror device that will enable the problems highlighted previously to be overcome.

SUMMARY

Disclosed herein is a microelectromechanical mirror device including, in a die of semiconductor material: a fixed structure defining a cavity; a tiltable structure carrying a reflecting region, elastically suspended above the cavity and having a main extension in a horizontal plane; at least a first pair of driving arms, carrying respective piezoelectric structures, biased to generate a driving force such as to cause a rotation of the tiltable structure about a rotation axis parallel to a first horizontal axis of the horizontal plane; and elastic suspension elements, configured to elastically couple the tiltable structure to the fixed structure at the rotation axis, being rigid to movements out of the horizontal plane and compliant to torsion about the rotation axis. The driving arms of the first pair are magnetically coupled to the tiltable structure so as to cause its rotation about the rotation axis through magnetic interaction, following biasing of the respective piezoelectric structures.

Each of the driving arms of the first pair may be suspended in cantilever fashion above the cavity and may have a first end integrally coupled to the fixed structure and a second end facing at a distance the tiltable structure, being mechanically uncoupled from the tiltable structure.

Each of the driving arms of the first pair may carry a respective first magnet arrangement, and a respective second magnet arrangement for each first magnet arrangement may be coupled to the tiltable structure. Each first magnet arrangement may be magnetically coupled to a respective second magnet arrangement so as to generate a magnetic interaction force designed to transfer the driving force generated by the respective driving arm to the tiltable structure.

The magnetic interaction force may be a magnetic attraction force.

The first magnet arrangement may include at least one respective magnet, coupled to a bottom surface of the respective driving arm, facing the cavity. The second magnet arrangement may include at least one respective magnet, coupled to a respective bottom surface of the tiltable structure, in a position facing, in the horizontal plane, the respective magnet of the first magnet arrangement.

The driving arms of the first pair may carry the respective piezoelectric structure on a top surface, opposite to the bottom surface.

The first and second magnet arrangements may have a comb-fingered configuration.

Extension elements may be coupled to the tiltable structure, one for each of the driving arms of the first pair. Each of the extension elements may extend starting from the tiltable structure towards a respective driving arm and being configured to carry underneath, at a distal end with respect to the tiltable structure, a respective magnet of the respective second magnet arrangement.

The distal end of each extension element may be arranged within an opening provided in the second end of its respective driving arm. The first magnet arrangement may include a pair of magnets arranged laterally with respect to the respective magnet of the second magnet arrangement, to obtain a resulting comb-fingered configuration of the magnets.

The distal end of each extension element may have a finger-like shape, each finger of which extends transversally with respect to that extension element and carries an underlying respective magnet of the second magnet arrangement. The second end of the respective driving arm may have a corresponding finger-like shape, each finger of which carries underneath a respective magnet of the first magnet arrangement, to obtain a resulting comb-fingered configuration of the magnets.

The fixed structure may form, in the horizontal plane, a frame that delimits and surrounds the cavity, and has first and second supporting elements which extend longitudinally along the rotation axis within the cavity starting from the frame, on opposite sides of the tiltable structure. The elastic suspension elements may extend between the tiltable structure and a respective one of the first and second supporting elements.

A second pair of driving arms may be coupled to the tiltable structure and carry respective piezoelectric structures biased to generate a driving force such as to cause a rotation of the tiltable structure about the rotation axis. The driving arms of the second pair may be arranged on an opposite side to the driving arms of the first pair with respect to a second horizontal axis of the horizontal plane, orthogonal to the first horizontal axis.

Also disclosed herein is a process for manufacturing a microelectromechanical mirror device including: forming, in a die of semiconductor material: a fixed structure defining a cavity; a tiltable structure carrying a reflecting region, elastically suspended above the cavity and having a main extension in a horizontal plane; at least a first pair of driving arms, carrying respective piezoelectric structures biased to generate a driving force such as to cause a rotation of the tiltable structure about a rotation axis parallel to a first horizontal axis of the horizontal plane; and elastic suspension elements, configured to elastically couple the tiltable structure to the fixed structure at the rotation axis, being rigid to movements out of the horizontal plane and compliant to torsion about the rotation axis. The process further includes magnetically coupling the first pair of driving arms to the tiltable structure so as to cause its rotation about the rotation axis by magnetic interaction, following biasing of the respective piezoelectric structures.

Magnetically coupling may include forming a respective first magnet arrangement carried by each driving arm and a respective second magnet arrangement for each first magnet arrangement carried by the tiltable structure. Each first magnet arrangement may be magnetically coupled to a respective second magnet arrangement so as to generate a magnetic interaction force designed to transfer the driving force generated by the respective driving arm to the tiltable structure.

Forming the first and second magnet arrangements may include carrying out machining of the die from the back of the die.

BRIEF DESCRIPTION OF THE DRAWINGS

For a better understanding, preferred embodiments thereof are now described, purely by way of non-limiting example, with reference to the attached drawings, wherein.

DETAILED DESCRIPTION

As will be described in detail hereinafter, an aspect of this disclosure envisages replacing the elastic mechanical coupling between the actuation structure and the tiltable structure of the microelectromechanical mirror device (implemented in the known implementations by the elastic driving elements 14a-14d, see the aforesaid FIG. 1 and the previous discussion) with a coupling of a magnetic type.

The driving force is thus transmitted from the driving arms of the actuation structure to the tiltable structure by a magnetic interaction force, without mechanical coupling, in particular of an elastic type.

Use of this magnetic coupling thus allows the avoidance of the discussed challenges of sizing and possible failure or damage to the elastic driving elements (which, in this case, are not present in the microelectromechanical mirror device).

Figure 2:
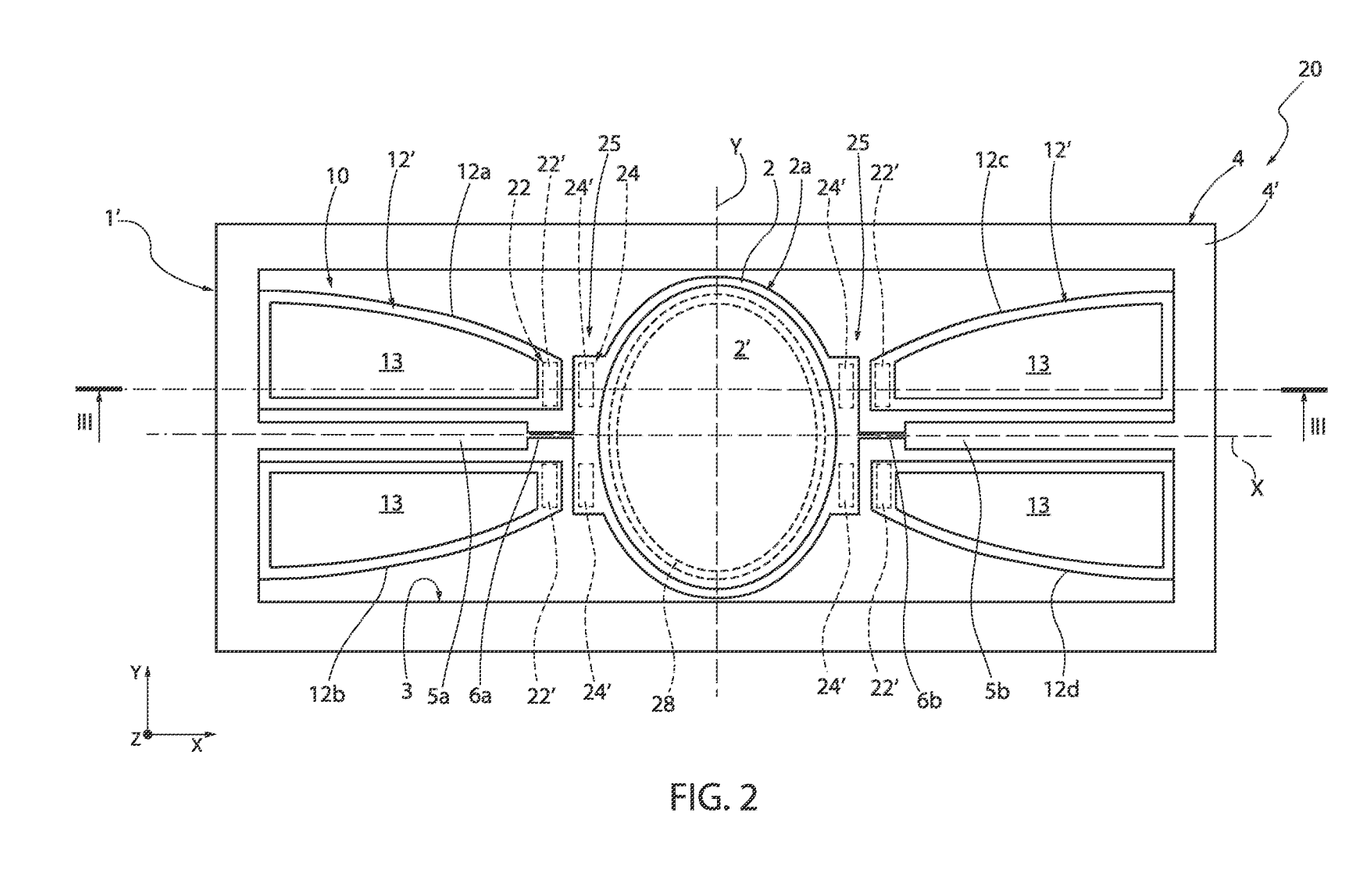
FIG. 2 is a schematic and simplified top view of a microelectromechanical mirror device, according to an embodiment of this disclosure.

FIG. 2 is a schematic illustration of a microelectromechanical mirror device according to a possible embodiment of this disclosure, designated in general by 20.

This microelectromechanical mirror device 20 has in general a structure and a configuration similar to the device described with reference to FIG. 1 and therefore comprises:

the tiltable structure 2, carrying at the top, over the corresponding top surface 2a, the reflecting region 2', suspended within the cavity 3 defined by the frame 4' of the fixed structure 4 and elastically coupled to the first and the second supporting elements 5a, 5b of the fixed structure 4 by the first and the second elastic suspension elements 6a, 6b (which couple the tiltable structure 2 to the fixed structure 4, enabling rotation thereof about the rotation axis X while providing a high stiffness in regard to movements out of the horizontal plane xy); and the actuation structure 10, interposed between the frame 4' of the fixed structure 4 and the tiltable structure 2 and configured to drive the same tiltable structure 2 in the rotation about the rotation axis X.

Unlike what has been described previously with reference to the aforesaid FIG. 1, the actuation structure 10 in this case is not mechanically coupled to the tiltable structure 2 and does not contribute to supporting the same tiltable structure 2 over the cavity 3.

The actuation structure 10 also comprises in this case the first pair of driving arms formed by the first and the second driving arms 12a, 12b, which are here suspended in cantilever fashion above the cavity 3, being integrally coupled to the frame 4' of the fixed structure 4 at their first end (major side) and having their second end (minor side) free, mechanically uncoupled from the tiltable structure 2, facing the same tiltable structure 2 at a certain separation distance (gap).

Also in this case, the aforesaid first and second driving arms 12a, 12b carry a respective piezoelectric structure 13 at the respective top surface 12' and are arranged on opposite sides of, and symmetrically with respect to the first rotation axis X and to the first supporting element 5a, having a longitudinal extension parallel to the first horizontal axis x and to the aforesaid first supporting element 5a.

The actuation structure 10 further comprises the second pair of driving arms formed by the third and fourth driving arms 12c, 12d, which are arranged on opposite sides with respect to the first rotation axis X and with respect to the second supporting element 5b and having a longitudinal extension parallel to the first horizontal axis x and to the aforesaid second supporting element 5b (in a way symmetrical to the first pair of driving arms 12a, 12b with respect to the second median axis of symmetry Y).

The driving arms 12c-12d of the second pair are suspended in cantilever fashion above the cavity 3 and carry, at the respective top surface 12', the respective piezoelectric structure 13.

According to an aspect of this disclosure, each driving arm 12a-12d is in this case magnetically coupled to the tiltable structure 2, at the respective second end.

For this purpose, each driving arm 12a-12d carries, an underlying first magnet arrangement 22, at a corresponding bottom surface 12'(see also subsequent FIG. 3), opposite to the top surface 12' carrying the respective piezoelectric structure 13.

For instance, the first magnet arrangement 22 may comprise a respective magnet 22' having a substantially parallelepipedal shape, integrally coupled to the respective driving arm 12a-12d and extending vertically starting from the bottom surface 12" towards the cavity 3.

Furthermore, the tiltable structure 2 carries a second magnet arrangement 24 at a bottom surface 2b (opposite to the top surface 2a carrying the reflecting surface 2').

For instance, this second magnet arrangement 24 comprises a respective magnet 24' having a substantially parallelepipedal shape, extending vertically starting from the bottom surface 2b towards the cavity 3.

In particular, the first and the second magnet arrangements 22, 24 are arranged in a position facing each other in the horizontal plane xy at a certain separation distance, thus with a gap in between.

The value of this gap depends on a compromise between a minimum value defined by layout constraints and a maximum value determined on the basis of the reduction of the magnetic field and of the resulting coupling force; for example, this gap may be comprised between 50 μm and 100 μm, preferably being equal to 50 μm.

Each first and second magnet arrangement 22, 24, facing one another, form in this way a respective magnetic pair 25, which is thus associated with each driving arm 12a-12d of the actuation structure 10.

In particular, each magnetic pair 25 is configured, as a result of an associated magnetic biasing, so as to set up a magnetic attraction force between the respective first and second magnet arrangements 22, 24 (and thus between the respective driving arm 12a-12d and the tiltable structure 2).

During operation, a vertical displacement (along the aforesaid orthogonal axis z) of each driving arm 12a-12d due to electrical biasing of the corresponding piezoelectric structure 13 therefore causes a corresponding vertical displacement of the tiltable structure 2 as a result of the magnetic interaction force exerted by the respective magnetic pair 25, which transfers the piezoelectric driving force from the same driving arm 12a-12d to the tiltable structure 2.

Simulations made by the Inventors have demonstrated the possibility of obtaining, through this magnetic interaction, forces for driving the tiltable structure 2 that are altogether comparable with the elastic forces that can be obtained with traditional approaches (see, for example FIG. 1, with the presence of the elastic driving elements 14a-14d).

In greater detail, during operation of the microelectromechanical device 20, application of a biasing voltage to the piezoelectric structure 13 of the first driving arm 12a (having a positive value with respect to the biasing of the piezoelectric structure 13 of the second driving arm 12b, which may, for example, be connected to a ground reference potential) causes a rotation of the tiltable structure 2 of a positive angle about the rotation axis X, thanks to the aforesaid magnetic coupling implemented by the respective magnetic pair 25.

In a corresponding manner, application of a biasing voltage to the piezoelectric structure 13 of the second driving arm 12b (having a positive value with respect to the biasing of the piezoelectric structure 13 of the first driving arm 12a) causes a corresponding rotation of the biasing structure 2 of a negative angle about the same rotation axis X.

The same biasing voltage may advantageously be applied to the piezoelectric structures 13 both of the first driving arm 12a and of the third driving arm 12c, and, similarly, to cause the opposite rotation, to the piezoelectric structures 13 both of the second driving arm 12b and of the fourth driving arm 12d so as to contribute in a corresponding manner to rotation of the tiltable structure 2 about the rotation axis X.

Figure 3:
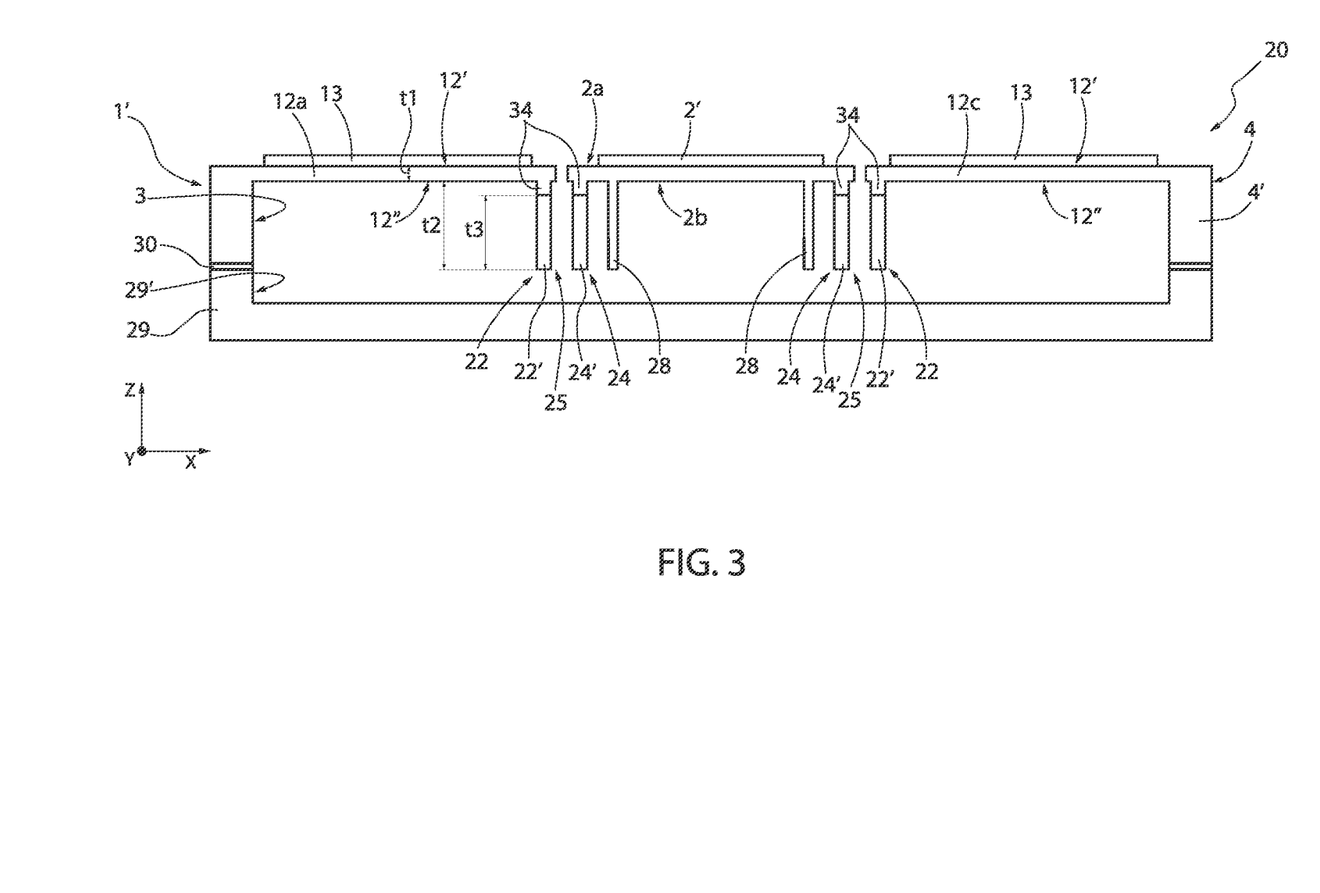
FIG. 3 is a schematic and simplified cross-sectional view taken along the line of cross-section III-III of the microelectromechanical mirror device of FIG. 2.

FIG. 3 shows a schematic cross-sectional view of the aforesaid microelectromechanical mirror device 20.

In particular, this cross-sectional view (parallel to the first horizontal axis x) shows that the thickness (along the orthogonal axis z) of the driving arms 12a-12d (and, in a way not illustrated, also of the elastic suspension elements 6a, 6b) corresponds to the thickness of the tiltable structure 2, for example, being equal to 20 μm, this thickness being referred to hereinafter as first thickness $t_1$ (the aforesaid elements are basically formed on the front of the die 1').

A reinforcement structure 28 is furthermore coupled underneath the tiltable structure 2, having the function of mechanical reinforcement for the tiltable structure 2 (and furthermore designed to guarantee the planarity, or flatness, of the same tiltable structure 2 in the horizontal plane xy, in resting conditions); this reinforcement structure 28 has a second thickness $t_2$ along the orthogonal axis z greater than the first thickness, for example, being equal to 140 μm; the reinforcement structure 28 may have, for example, (as shown in FIG. 2) an annular shape and may be arranged at the periphery of the tiltable structure 2 (this reinforcement structure 21 is basically formed on the back of the die 1').

The fixed structure 4 of the microelectromechanical device 2 (in particular, the frame 4') has, along the orthogonal axis z, a thickness substantially equal to the sum of the aforesaid first and second thicknesses $t_1$, $t_2$.

As shown in the same FIG. 3, a base body 29 is coupled underneath the fixed structure 4 and has, underneath the cavity 3 and at the mobile structure 2, a recess 29' to enable rotation of the mobile structure 2. In particular, the frame 4' is coupled to this supporting body 29 by appropriate regions of bonding material 30.

The first and second magnet arrangements 22, 24 are coupled underneath the corresponding driving arm (shown by way of example in FIG. 3 are the first and the third driving arms 12a, 12c) and, respectively, underneath the tiltable structure 2, and are thus provided on the back of the die 1'.

In the embodiment illustrated in FIG. 3, the aforesaid first and second magnet arrangements 22, 24 each comprise a respective magnet 22', 24', having a third thickness $t_3$ along the orthogonal axis z, comprised between the first thickness $t_1$ and the second thickness $t_2$ equal, for example, to 100 μm, and is coupled to the corresponding driving arm 12a, 12c and, respectively, to the tiltable structure 2 by a connecting portion 34, of semiconductor material.

This connecting portion 34 is therefore interposed, in the case of the first magnet arrangement 22, between the bottom surface 12" of the respective driving arm 12a, 12c and the respective magnet 22', and, in the case of the second magnet arrangement 24, between the bottom surface 2b of the tiltable structure 2 and the respective magnet 24'.

Advantageously, the first and the second magnet arrangements 22, 24 may be obtained using manufacturing techniques compatible with the processes for manufacturing MEMS structures being used for obtaining the microelectromechanical mirror device 20 starting from the die 1'.

For instance, the first and second magnet arrangements 22, 24 may be made using a technique based on the agglomeration of powders of magnetic material of micrometric sizes, by atomic-layer deposition (ALD). Materials usable for this purpose may, for example, include sintered powders consisting of neodymium (NdFeB), samarium cobalt (SmCo), or iron (Fe).

Figure 4A:
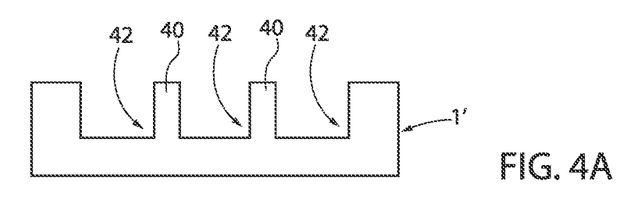
FIGS. 4A-4C show in a simplified manner successive steps of an exemplary manufacturing process of a magnet arrangement in the microelectromechanical mirror device of this disclosure.

As shown schematically in FIG. 4A, this technique may envisage formation, by machining from the back of the die 1' (here shown upside down) of vertical walls 40 that define between them one or more microcavities 42, in particular at the second ends of the driving arms 12a-12d and furthermore at the facing portions of the tiltable structure 2 (here not shown for simplicity of illustration).

Figure 4B:
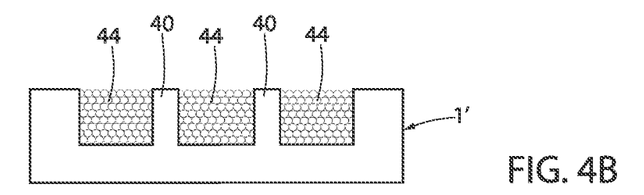

Next, FIG. 4B, these microcavities 42 may be filled with powder 44 of appropriate magnetic material.

Figure 4C:
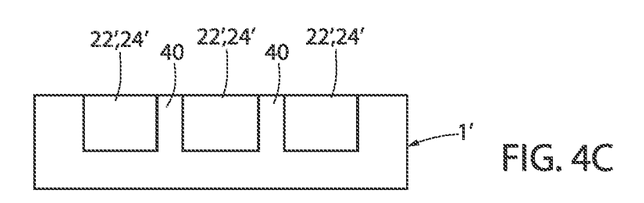

Then, FIG. 4C, this material undergoes an ALD process for its solidification within the microcavities 42; the solidified material is then subjected to a magnetic field to cause magnetic polarization thus defining the first and the second magnet arrangements 22, 24 and the corresponding magnets 22', 24'.

In a way not illustrated, the vertical walls 40 may be removed so as to leave just the aforesaid first and second magnet arrangements 22, 24 on the back of the die 1'.

Figure 5:
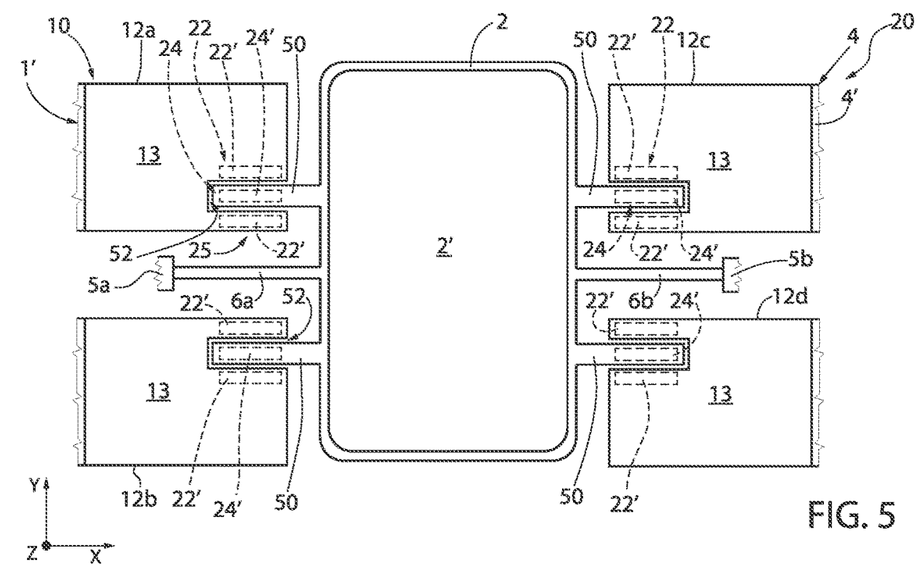
FIGS. 5-6 are schematic and simplified top views of a microelectromechanical mirror device according to further embodiments of this disclosure.

FIG. 5 shows a possible further embodiment of the microelectromechanical mirror device 20, which differs due to the presence of a comb-fingered configuration of the first and the second magnet arrangements 22, 24 associated with each driving arm 12a-12d and with the tiltable structure 2.

In particular, in this case, extension elements 50 are coupled to the tiltable structure 2, one for each driving arm 12a-12d; in a way not illustrated in the aforesaid FIG. 5, these extension elements 50 have, for example, the aforesaid first thickness $t_1$ along the orthogonal axis z.

Each extension element 50 extends starting from the tiltable structure 2 towards the respective driving arm 12a-12d, in the example along the first horizontal axis x, and is configured so as to carry underneath, at a distal end with respect to the tiltable structure 2, the second magnet arrangement 24, here comprising a respective magnet 24'.

In the embodiment illustrated in FIG. 5, the aforesaid distal end of the extension element 50 is inserted into an opening 52 provided in the second end of the respective driving arm 12a-12d. The first magnet arrangement 22 comprises in this case a pair of magnets 22' arranged laterally (along the second horizontal axis y) with respect to the aforesaid opening 52 and to the respective magnet 24' of the second magnet arrangement 24, to obtain a resulting comb-fingered configuration of the same magnets 22', 24'.

Figure 6:
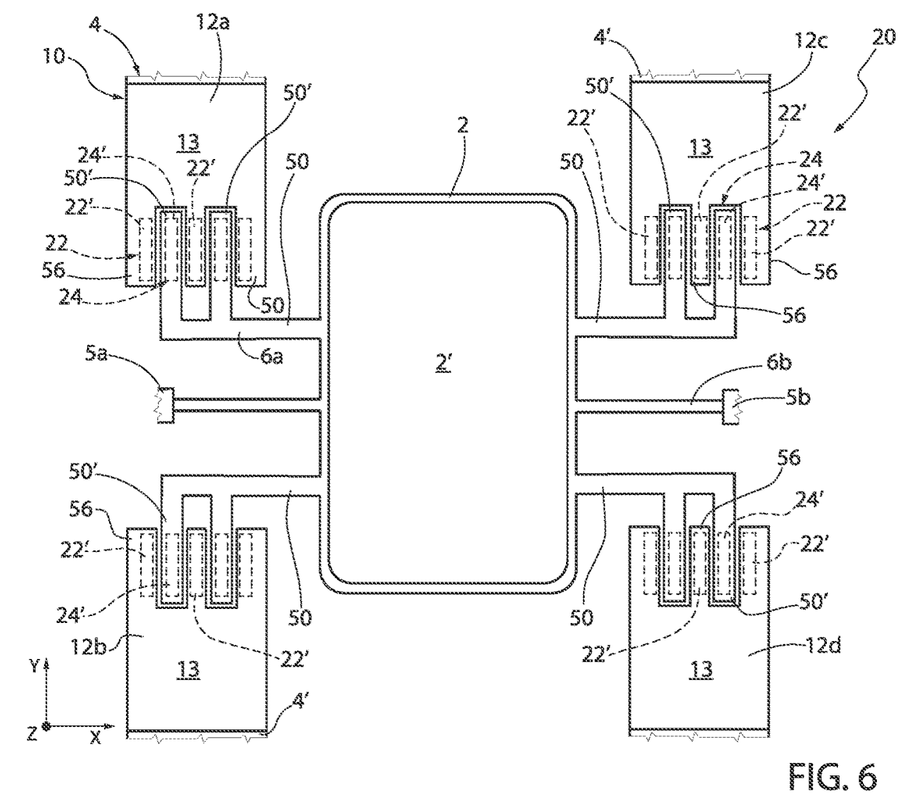

In a further embodiment, illustrated in FIG. 6, the aforesaid distal end of the extension element 50 has a finger-like shape 50' (in the example, with two fingers), each of which extends transversally with respect to the extension element 50 (along the second horizontal axis y) and carries underneath a respective magnet 24' of the second magnet arrangement 24. In this case, a plurality of openings 52 are provided in the second end of the respective driving arm 12a-12d for housing the aforesaid fingers 50' of the extension element 50.

Similarly, the second end of the respective driving arm 12a-12d, which here has a main extension along the second horizontal axis y, has a corresponding finger-like shape 56 (in the example, with three fingers), each carrying underneath a respective magnet 22' of the first magnet arrangement 22, to obtain the resulting comb-fingered configuration of the magnets 22 ', 24'.

The comb-fingered configuration of the first and second magnet arrangements 22, 24 allows in general obtainment of an increase of the resulting force of magnetic coupling for driving the tiltable structure 2 of the microelectromechanical mirror device 20, by the actuation structure 10.

Figure 7:
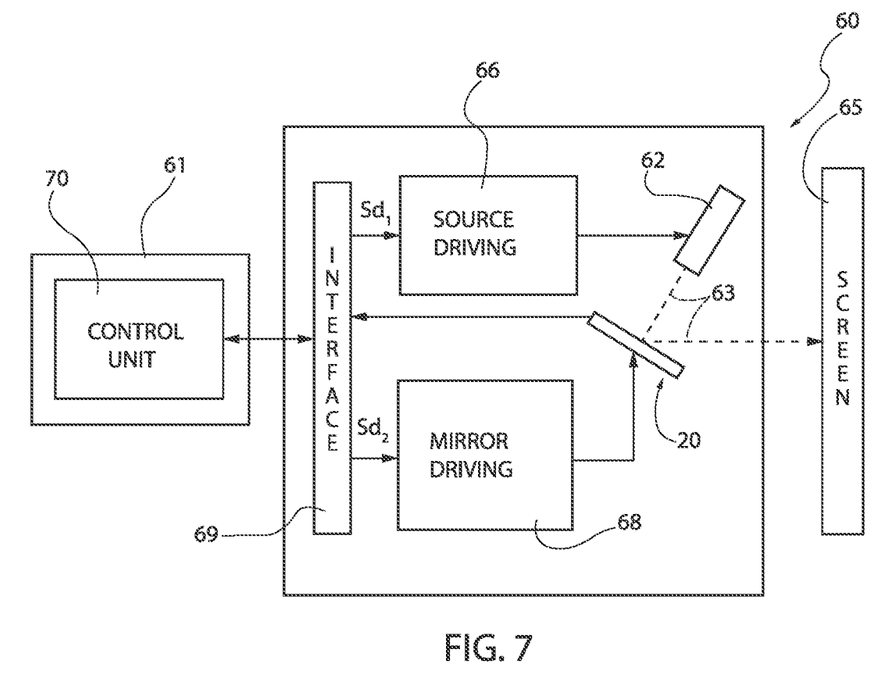
FIG. 7 is a general block diagram of an optoelectronic apparatus, for example, a picoprojector, using the microelectromechanical mirror device of this disclosure.

As illustrated schematically in FIG. 7, the microelectromechanical mirror device 20 may be advantageously used in an optoelectronic device, such as a picoprojector, 60, designed, for example, to be functionally coupled to a portable electronic apparatus 61 (such as a smartphone or augmented-reality goggles).

In detail, the optoelectronic device 60 comprises a light source 62, for example of a laser type, designed to generate a light beam 63; the microelectromechanical mirror device 20, acting as mirror and designed to receive the light beam 63 and direct it towards a screen or display surface 65 (external and set at a distance from the pico-projector 60); a first driving circuit 66, designed to supply appropriate control signals to the light source 62 for generation of the light beam 63, as a function of an image to be projected; a second driving circuit 68, designed to supply appropriate control signals to the actuation structure 10 of the microelectromechanical mirror device 20; and an interface 69, designed to receive, from a control unit 70, in this case external, for example, included in the portable apparatus 61, first control signals $S_{d1}$, for controlling the first driving circuit 66, and second control signals $S_{d2}$, for controlling the second driving circuit 68.

The advantages of this disclosure emerge clearly from the foregoing description.

In any case, it is highlighted again that the techniques described for driving the tiltable structure 2 by magnetic coupling enables an increase in the resistance to stress of the microelectromechanical mirror device 20, thereby preventing possible failure thereof or damage thereto.

The actuation structure 10 is in fact mechanically uncoupled from the tiltable structure 2.

In particular, thanks to the absence of the elastic coupling elements between the actuation structure 10 and the tiltable structure 2, it is possible to reduce the size of the die 1' and/or increase the efficiency of the piezoelectric structures 13 of the actuation structure 10, without having to reach a compromise with the resistance to stress of the elastic coupling elements (here not present and replaced, in fact, by the magnetic interaction).

In general, this disclosure enables exploitation of the advantages of piezoelectric actuation (namely, the use of lower biasing voltages with a lower energy consumption to obtain large displacements) and of piezoresistive detection of mirror actuation, at the same time having improved mechanical and electrical performance as compared to known approaches.

Finally, it is clear that modifications and variations may be made to what has been described and illustrated, without thereby departing from the scope of this disclosure.

For instance, the techniques described above may also be applied in the case of a biaxial embodiment of the microelectromechanical mirror device (in a way similar to what has been described in detail in the aforesaid United States Patent Publication No. 2020/0192199, corresponding to European Patent Application 3666727A1), namely, in the case where the tiltable structure 2 is able to perform movements of rotation both about a first rotation axis (coinciding with the first rotation axis X parallel to the first horizontal axis x) and about a second rotation axis (coinciding with the second median axis of symmetry Y parallel to the second horizontal axis y).

Furthermore, in general variants may be envisaged regarding the shape of the elements forming the microelectromechanical mirror device 20, for example, different shapes of the tiltable structure 2 (and of the corresponding reflecting region 2'), or different shapes and/or arrangements of the driving arms 12a-12d.

Furthermore, the first and the second elastic suspension elements 6a, 6b could alternatively be, instead of a linear type, of a folded or bent type.

In a way not illustrated in detail, the aforesaid first and second magnet arrangements 22, 24 may further comprise a plurality of respective magnets 22', 24' arranged in an array or grid, which are jointly intended to provide magnetic coupling between the respective driving arms 12a-12d and the tiltable structure 2.

Furthermore, different types of movement for the tiltable structure 2 may be envisaged, for example, a quasi-static or a resonant movement.

The invention claimed is:

1. A microelectromechanical mirror device, comprising, in a die of semiconductor material:
   a fixed structure defining a cavity;
   a tiltable structure carrying a reflecting region, wherein said tiltable structure is elastically suspended above the cavity and has a main extension in a horizontal plane;
   at least a first pair of driving arms carrying respective piezoelectric structures configured to be biased to generate a driving force such as to cause a rotation of the tiltable structure about a rotation axis parallel to a first horizontal axis of said horizontal plane; and
   elastic suspension elements configured to elastically couple said tiltable structure to said fixed structure at said rotation axis, wherein said elastic suspension elements are rigid to movements out of the horizontal plane and compliant to torsion about said rotation axis;
   wherein driving arms of said first pair of driving arms are magnetically coupled to said tiltable structure so as to cause its rotation about the rotation axis through magnetic interaction following biasing of the respective piezoelectric structures.

2. The device according to claim 1, wherein each driving arm of the first pair of driving arms is suspended in cantilever fashion above said cavity and has a first end integrally coupled to said fixed structure and a second end facing at a distance said tiltable structure and being mechanically uncoupled from said tiltable structure.

3. The device according to claim 2, wherein each driving arm of the first pair of driving arms carries a respective first magnet arrangement, and wherein a respective second magnet arrangement for each first magnet arrangement is coupled to said tiltable structure; and wherein each first magnet arrangement is magnetically coupled to the respective second magnet arrangement so as to generate a magnetic interaction force configured to transfer the driving force generated by the respective driving arm to said tiltable structure.

4. The device according to claim 3, wherein said magnetic interaction force is a magnetic attraction force.

5. The device according to claim 3, wherein said first magnet arrangement comprises at least one respective magnet coupled to a bottom surface of the respective driving arm and facing said cavity; and wherein said second magnet arrangement comprises at least one respective magnet coupled to a respective bottom surface of said tiltable structure in a position facing, in the horizontal plane, at least one respective magnet of said first magnet arrangement.

6. The device according to claim 5, wherein said driving arms of the first pair of driving arms carry the respective piezoelectric structure on a top surface, opposite to said bottom surface.

7. The device according to claim 3, wherein said first and second magnet arrangements have a comb-fingered configuration.

8. The device according to claim 7, further comprising extension elements coupled to said tiltable structure, one extension element for each driving arm of the first pair of driving arms; wherein each extension element extends starting from the tiltable structure towards a respective driving arm and is configured to carry underneath, at a distal end with respect to the tiltable structure, a respective magnet of the respective second magnet arrangement.

9. The device according to claim 8, wherein said distal end of each extension element is arranged within an opening provided in the second end of its respective driving arm; and wherein said first magnet arrangement comprises a pair of magnets arranged laterally with respect to the respective magnet of the second magnet arrangement to obtain a resulting comb-fingered configuration of said magnets.

10. The device according to claim 8, wherein said distal end of each extension element has a finger-like shape, wherein each finger extends transversally with respect to that extension element and carries an underlying respective magnet of the second magnet arrangement; and wherein the second end of the respective driving arm has a corresponding finger-like shape, wherein each finger carries underneath a respective magnet of the first magnet arrangement, to obtain a resulting comb-fingered configuration of said magnets.

11. The device according to claim 1, wherein said fixed structure forms, in the horizontal plane, a frame that delimits and surrounds said cavity, wherein the fixed structure has first and second supporting elements which extend longitudinally along said rotation axis within the cavity starting from said frame, on opposite sides of said tiltable structure; and wherein said elastic suspension elements extend between said tiltable structure and a respective one of said first and second supporting elements.

12. The device according to claim 1, further comprising a second pair of driving arms coupled to the tiltable structure and carrying respective piezoelectric structures configured to be biased to generate a driving force such as to cause a rotation of the tiltable structure about said rotation axis; and wherein the driving arms of said second pair of driving arms are arranged on an opposite side to the driving arms of said first pair of driving aims with respect to a second horizontal axis of said horizontal plane, orthogonal to said first horizontal axis.

13. A process for manufacturing a microelectromechanical mirror device, comprising:
  forming a fixed structure defining a cavity in a die of semiconductor material;
  elastically suspending a tiltable structure above the cavity, the tiltable structure carrying a reflecting region and having a main extension in a horizontal plane;
  forming at least a first pair of driving arms in the die of semiconductor material, the first pair of driving arms carrying respective piezoelectric structures biased to generate a driving force such as to cause a rotation of the tiltable structure about a rotation axis parallel to a first horizontal axis of said horizontal plane;
  elastically coupling said tiltable structure to said fixed structure at said rotation axis using elastic suspension elements, the elastic suspension elements being rigid to movements out of the horizontal plane and compliant to torsion about said rotation axis; and
  magnetically coupling said first pair of driving arms to said tiltable structure so as to cause its rotation about the rotation axis by magnetic interaction, following biasing of the respective piezoelectric structures.

14. The process according to claim 13, wherein magnetically coupling comprises forming a respective first magnet arrangement carried by each driving arm and a respective second magnet arrangement for each first magnet arrangement carried by said tiltable structure; wherein each first magnet arrangement is magnetically coupled to a respective second magnet arrangement so as to generate a magnetic interaction force designed to transfer the driving force generated by the respective driving arm to said tiltable structure.

15. The process according to claim 14, wherein forming said first and second magnet arrangements comprises carrying out machining of said die from the back of said die.

16. A microelectromechanical mirror device, comprising, in a die of semiconductor material:
  a fixed structure defining a cavity;
  a tiltable structure carrying a reflecting region, wherein said tiltable structure is elastically suspended above the cavity;
  at least a first pair of driving arms carrying respective piezoelectric structures configured to be biased to generate a driving force such as to cause a rotation of the tiltable structure about a rotation axis; and
  elastic suspension elements configured to elastically couple said tiltable structure to said fixed structure at said rotation axis;
  wherein driving arms of said first pair of driving arms are magnetically coupled to said tiltable structure.

17. The device according to claim 16, wherein each driving arm of the first pair of driving arms is suspended in cantilever fashion above said cavity and has a first end integrally coupled to said fixed structure and a second end facing at a distance said tiltable structure and being mechanically uncoupled from said tiltable structure.

18. The device according to claim 17, wherein each driving arm of the first pair of driving arms carries a respective first magnet arrangement, and wherein a respective second magnet arrangement for each first magnet arrangement is coupled to said tiltable structure; and wherein each first magnet arrangement is magnetically coupled to the respective second magnet arrangement.

19. The device according to claim 18, wherein said first magnet arrangement comprises at least one respective magnet coupled to a bottom surface of the respective driving arm and facing said cavity; and wherein said second magnet arrangement comprises at least one respective magnet coupled to a respective bottom surface of said tiltable structure in a position facing at least one respective magnet of said first magnet arrangement.

20. The device according to claim 19, wherein said driving arms of the first pair of driving arms carry the respective piezoelectric structure on a top surface, opposite to said bottom surface.

\* \* \* \* \*